United States Patent [19]
Ritter et al.

[11] Patent Number: 5,841,734
[45] Date of Patent: Nov. 24, 1998

[54] ROTATING ACOUSTIC TRANSDUCER HEAD FOR CEMENT BOND EVALUATION TOOL

[75] Inventors: Thomas E. Ritter, Katy; James Robert Birchak, Spring; James W. Stroud, Houston; Mack H. Brown, Houston; James E. Masino, Houston; John W. Minear, Houston, all of Tex.

[73] Assignee: Halliburton Energy Services, Inc., Houston, Tex.

[21] Appl. No.: 870,116

[22] Filed: Jun. 5, 1997

[51] Int. Cl.⁶ .................................................. G01V 1/00
[52] U.S. Cl. ........................... 367/35; 367/86; 367/911; 367/912; 181/104; 181/105; 73/152.17; 175/50
[58] Field of Search ................ 367/35, 86, 911, 367/912; 181/104, 105; 73/152.17; 175/50

[56] References Cited

U.S. PATENT DOCUMENTS

| | | | |
|---|---|---|---|
| 4,255,798 | 3/1981 | Havira | 367/35 |
| 4,601,024 | 7/1986 | Broding | 367/86 |
| 4,805,156 | 2/1989 | Attali et al. | 367/35 |
| 4,916,648 | 4/1990 | Gard | 367/35 |
| 4,999,817 | 3/1991 | Zimmer | 367/65 |
| 5,001,676 | 3/1991 | Broding | 367/31 |
| 5,216,638 | 6/1993 | Wright | 367/35 |
| 5,477,101 | 12/1995 | Ounadjela | 310/334 |
| 5,594,176 | 1/1997 | Kiefer | 73/623 |
| 5,652,617 | 7/1997 | Barbour | 348/85 |

FOREIGN PATENT DOCUMENTS

| | | | |
|---|---|---|---|
| 0549419 | 6/1993 | European Pat. Off. | G01V 1/40 |

OTHER PUBLICATIONS

SPE Drilling & Completion; Jun. 1995; *Standoff and Caliper Measurements While Drilling Using a New Formation–Evaluation Tool with Three Ultrasonic Transducers*; Moake, Birchak, Matthews, Schultz; (pp. 104–111).
Halliburton Energy Services; *CAST Borehole Imaging*; 1995.

*Primary Examiner*—J. Woodrow Eldred
*Attorney, Agent, or Firm*—Conley, Rose & Tayon, P.C.

[57] ABSTRACT

An apparatus for logging a borehole comprises a non-rotating component and a rotating component that is flexibly attached to the non-rotating component and includes a logging head. The rotating component is centralized independently from the non-rotating component such that the rotating component remains centralized as it rotates, regardless of whether the non-rotating component is centralized. The logging head includes at least one signaling device, a hydrostatic pressure balancing system, a sealed, variable-volume fluid reservoir in fluid communication with said transducer, and a motor housed in said logging head for rotating the rotating component. The apparatus can further include a second non-rotating component suspended below the rotating component.

29 Claims, 4 Drawing Sheets

ROTATING ACOUSTIC TRANSDUCER HEAD FOR CEMENT BOND EVALUATION TOOL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to apparatus and methods for acoustically determining wellbore conditions in cased and uncased bore holes. In more particular aspects, the invention relates to acoustic scanning tools for conducting ultrasonic inspections and evaluations and to means for centering an acoustic scanning tool in a hole. Still more particularly, the present invention comprises a logging head that can be centered and rotated independently from the equipment to which the logging tool is affixed.

2. Description of the Related Art

In conjunction with drilling operations, wireline logging tools are used to inspect the cased and uncased portions of a bore hole. These logging tools typically incorporate at least one of several types of logging systems. Common types of logging systems use electric, acoustic or nuclear signals to collecting information about the substances surrounding the logging tool. Although the following discussion is presented in terms of an acoustic logging system, it will be understood that the novel features of the invention are equally applicable to other types of logging systems.

Acoustic systems use ultrasonic transducers that, through known acoustic signaling and signal processing techniques, are able to derive information concerning the condition of the wellbore. In a cased wellbore, the various types of logging tools are used to determine the thickness of casing, the presence of damaged casing, and the condition of the cement bond along the casing's outer surface, among other things. In uncased portions of a wellbore, logging tools are used to determine features in the borehole wall such as dips, washouts, holes and cracks.

There are basically two types of acoustic logging tools in use today. One type rotates the transducers to conduct scanning about the bore hole. Another type uses fixed transducers that do not rotate. An example of a tool which does not use rotating transducers is the Pulse Echo Tool (PET) available from Halliburton Company. PET is primarily designed as a tool for use in cased bore holes. It contains eight ultrasonic transducers, which survey the circumference of the casing at 45° increments about the circumference of the casing. The signals transmitted and reflected back can be used to ascertain completeness of the bond of the cement to the casing. They can also indicate the actual thickness of the casing, detect channels and measure inner and outer casing corrosion. The transducers of the PET can be adjusted radially inwardly or outwardly with respect to the tool's mandrel in order to achieve an optimum standoff. An example of a scanning tool using rotating transducers is the Halliburton CAST-V™. The CAST-V™ uses a scanner or incorporates a wireline-borne scanner sub that contains a motor. The motor is located in a sub of the CAST-V™ tool and rotates a transducer head at the lower end of the scanner sub via a shaft. The transducer head contains a transducer that takes readings as the head is rotated. The transducer is disposed within the head in a fixed manner and is not adjustable outwardly or inwardly.

Acoustic logging systems are vulnerable to mud attenuation effects. Too small a space between the transducer face and the borehole wall causes secondary reflections to interfere with the reflections of interest. On the other hand, if the spacing between the transducer face and the borehole wall is too great, the transducer's signals will be greatly attenuated, particularly where heavy weight (high density) borehole fluids are being used. Also, acoustic measurements depend, among other things, on path length and are therefore affected by variations in the transducer-to-wall distance.

For these reasons, it is critical that the transducers on a rotating tool be maintained at a constant distance from the casing or borehole wall. This is typically accomplished by using a transducer head whose outside diameter closely fits the inside diameter of the casing or borehole. For example, the CAST-V™ system currently comes with a number of different diameter heads so that the transducers can be placed at optimum standoff. For example, a CAST-V™ system might come with a 3⅝ inch diameter head, 4⅜ inch diameter head, 5⅝ diameter head and 7 inch diameter head.

Furthermore, existing rotating head designs require centralizing a massive mechanical package in order to centralize a relatively small logging head that is supported on the end of the package. In deviated wellbores, gravitational forces can result in severe de-centering of the massive tool body, resulting in unacceptable image quality, as the transducers are no longer maintained at a constant distance from the borehole wall as the head rotates. Hence, it is also desirable to eliminate the problems caused by de-centering of the tool body.

In addition, hydrostatic pressure of the fluid in the borehole annulus fluctuates with depth and in response to various extra pressures applied at the surface and variations in borehole fluid weight. Because transducers require that hydrostatic pressure be balanced across them, acoustic logging devices are typically provided with means for balancing hydrostatic pressure on the inside of the logging head with the hydrostatic pressure in the borehole. This pressure balancing means often comprises a fluid reservoir in the tool body that is in fluid communication with the backs of the transducers and is pressurized by a piston head that is biased toward the reservoir. Fluctuations in hydrostatic pressure are matched by expansions or contractions of the fluid in the reservoir and corresponding movement of the piston, thereby allowing hydrostatic pressure on both sides of the transducers to remain equal. Thus, any solution to the centralizing problems described above should include means for balancing the fluid pressure across the transducers if it is to be used in conjunction with an acoustic logging tool.

SUMMARY OF THE INVENTION

The present invention allows centering of the transducers used for logging without requiring centralization of the whole logging tool. Centralization of the transducers is accomplished by any of three alternative embodiments, each of which entails flexibly connecting the rotating head to the tool body from which it is suspended and providing centralizers that centralize the rotating head independently of the tool body. All three embodiments can include a motor located inside the rotating head. Transducers are mechanically affixed to the armature of the motor by the outer housing. All three embodiments provide for pressure balancing of the transducers in the logging tool and allow connection of the transmitting and receiving devices to conventional power source and data processing devices. The independently centralized logging tool of the present invention can utilize the same power sources and data processing devices that are used with currently available logging equipment.

According to a first embodiment, the rotating logging head is suspended at the lowermost end of the tool and flanked at either end by a centralizer. The rotating head is suspended from the tool by an assembly comprising a flexible coupling, electrical connector, tool joint and slip ring. This flexible assembly allows the centralized rotating head to remain centralized while rotating independently of the non-rotating tool body. The centralizers may rotate with the head assembly or may be stationary. Also, the centralizers may be powered open or may be not powered, without affecting the operation of the inventive concepts.

According to a second embodiment, the rotating head is again flanked at either end by a centralizer. In this embodiment, however, both ends of the rotating head are provided with flexible and non-rotatable couplings and a central, non-rotating shaft extends through the length of the rotating assembly. This shaft supports additional logging tools or other equipment located in the hole below the rotating head. The flexible couplings allow the centralized rotating head to remain centralized while rotating independently of the non-rotating tools above and below the rotating head.

According to a third embodiment, both ends of the rotating head are again provided with flexible and non-rotatable couplings and the rotating assembly is again provided with a central, non-rotating shaft. Rather than positioning both the receiving and transmitting transducers on the rotating head, however, the receiving transducers are positioned on a separate portion of the head that is centralized with the rotating portion but does not rotate. Both the rotating and non-rotating portions of the head are centralized independently from the non-rotating portions of the tool string above and below the head.

The present invention further comprises a novel transducer configuration that allows a transducer to fit into the reduced space available in the annular volume of the rotating head of second and third embodiments without severely compromising the signal amplitude available from that transducer. In the novel transducer configuration, the transducer face has an orientation that is normal or substantially normal to a radius of the rotating head, but the backing that extends behind the transducer face is angled relative to both the transducer face and the head radius, so that its length is not limited by the available radius length.

DETAILED DESCRIPTION OF THE INVENTION

Figure 1:
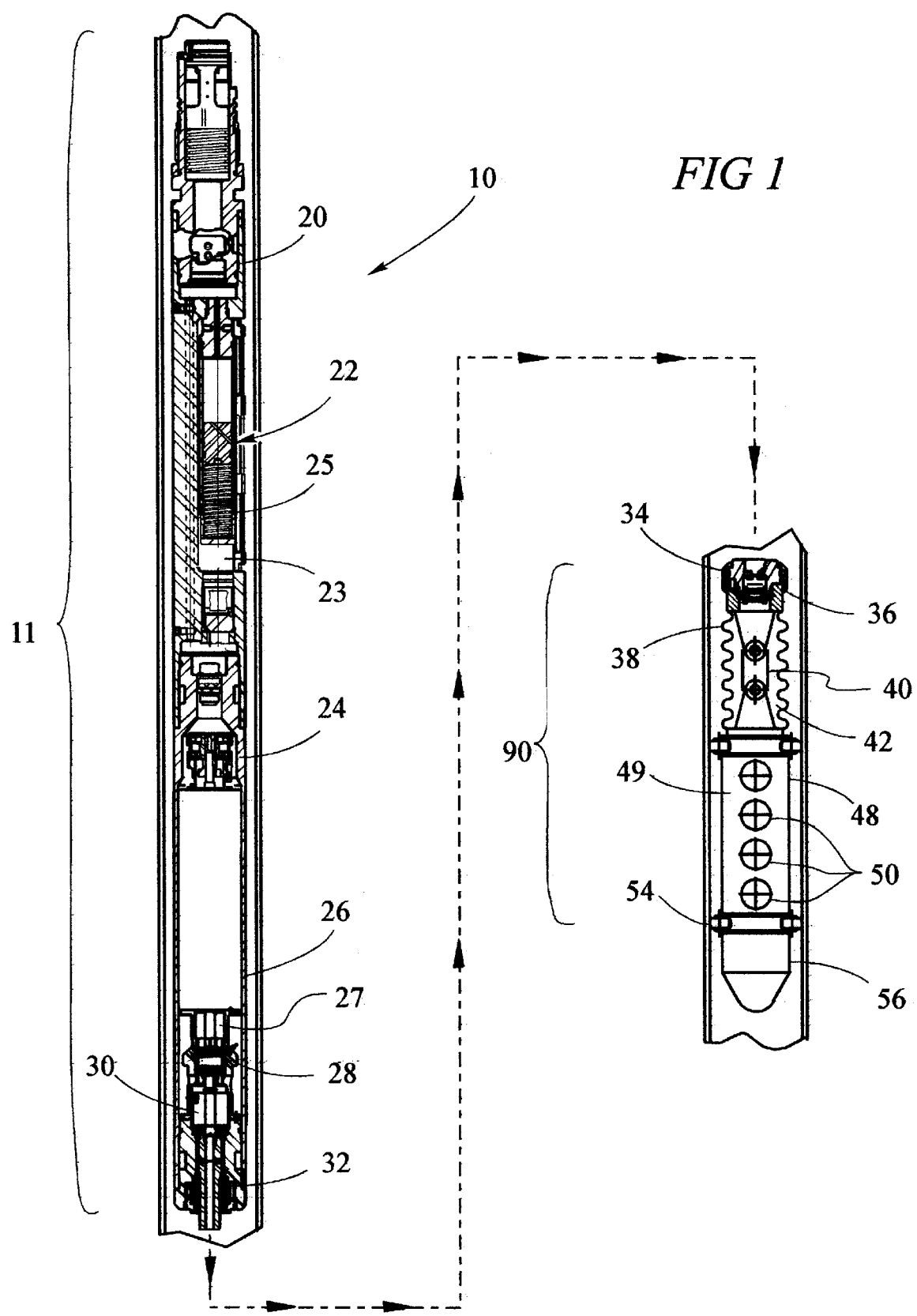
FIG. 1 is a schematic representation of a first embodiment of a logging tool constructed in accordance with the principles of the present invention.

Referring initially to FIG. 1, a first embodiment of a logging tool 10 constructed in accordance with the principles of the present invention comprises a non-rotating assembly 11 and a rotating assembly 90. Non-rotating assembly 11 comprises several components commonly used in logging tools, such as a hermetic connector 20, a hydrostatic balance system 22, a resolver 24, and a drive motor 26, a flexible shaft 28, a slip ring 30 and a seal 32.

Rotating assembly 90 preferably comprises a tool joint 34, an electrical connector 36, a bellows 38, a flexible coupling 40, an upper centralizer 46, a logging head 48, a lower centralizer 54 and a centralizer drive motor 56. Flexible coupling 40 preferably comprises a double universal joint, which allows movement of logging head 48 in any lateral direction while providing axial and torsional support.

Rotating assembly 90 is suspended from non-rotating assembly 11 by a shaft 27 that extends down from drive motor 26, through flexible coupling 28, slip ring 30, seal 32 and connects to tool joint 34. Drive motor 26 is preferably a brushless dc motor, but could be any other suitable motor type. During logging operations drive motor 26 rotates shaft 27, which transmits torque, causing rotation of tool joint 34 and the balance of rotating assembly 90. Slip ring 30 transmits electrical signals to and from the rotating head while allowing the head to rotate with respect to the non-rotating portion of the tool. In the embodiment shown, slip ring 30, Seal 32 may be any suitable seal that is capable of preventing leakage of the hydrostatic pressure balancing fluid out from the tool and prevent any inflow of borehole fluid into the tool. Seals suitable for this purpose, such as metal-to-metal seals, are known in the art.

Still referring to FIG. 1, logging head 48 preferably comprises a substantially cylindrical body 49, in which are housed a plurality of transducers 50. Transducers 50 may be any sort of transducers such as are known in the art, and may include both transmitting and receiving transducers, as shown in the embodiment of FIG. 1, or not, as discussed in detail below. Likewise, it will be understood that the number of transducers housed in logging head 48 is not limited to the number shown, so that head 48 may include more or fewer transducers.

Centralizers 46, 54 are affixed to either end of head 48 and rotate with it. Centralizers 46, 54, when deployed against the inside wall of the casing bear on the wall and cause head 48 to remain centered in the casing as it rotates. It will be understood that, while this description is generally set out in terms of a cased borehole, the concepts are equally applicable in an uncased borehole, in which case the centralizers are deployed against the borehole wall. Centralizers 46, 54 each preferably comprise a plurality of extendable rollers and/or casters (not shown), but may comprise any other suitable device capable of performing the centering function while traversing the inside wall surface. Casters would be used to facilitate rotation of centralizers 46, 54 as head 48 shifts axially. Centralizers 46, 54 are initially in a retracted position. Once the tool has been lowered to the point where logging is to begin, centralizers 46, 54 are extended by centralizer drive motor 56 until they contact the casing wall. Alternatively, centralizer drive motor 56 can be eliminated and centralizers 46, 54 can be normally biased open and lowered into the hole in an open state, as is known in the art.

Even though the heavy portions of the tool 11 located above rotating assembly 90 may have centralizers, they are unlikely to be centered in the casing, especially in deviated holes. Flexible coupling 40 allows lateral movement of head 48 with respect to the non-rotating portions of the tool and thus allows the relatively light head 48 to be centered, even if the rest of the tool is significantly eccentered.

As mentioned above, it is necessary to balance the fluid pressure across the face of each transducer. To this end, fluid-containing chamber 23 is provided as part of hydrostatic balance system 22. Chamber 23 is in fluid communication with a fluid passage that extends through shaft 27 into tool joint 34. The fluid passage through tool joint 34 and connector 36 opens into a chamber 42 formed by bellows 38, which is sealed to the adjacent components at each end. At its lower end, bellows chamber 42 is in fluid communication with the interior of head 48 and thus the back of each transducer. A piston 25 forms one end of chamber 23. Piston 25 is biased toward chamber 23 and allows the fluid volume of chamber 23 to fluctuate in response to changes in the temperature and hydrostatic pressure outside the tool. In this manner the enclosed fluid system ensures that the pressure on the back of each transducer remains balanced with the borehole hydrostatic pressure, as desired.

Enclosed within bellows 38 are flexible coupling 40 and all electrical wires (not shown) that conduct signals to and from the transducers up into the tool body. The wires connected to the various components of logging head 48 terminate at connector 36, which allows electrical connections to be made between the rotating and non-rotating parts. Connector 36 may be any suitable device and is preferably capable of connecting at least 8 wires.

In a preferred embodiment, tool joint 34 comprises a releasable connection such that the rotating assembly 90 can be easily connected and disconnected from the non-rotating assembly by means of tool joint 34. Tool joint 34 preferably includes hydraulic check valves that enable rotating assembly 90 to be removed from non-rotating assembly 11 while retaining the oil inside each respective assembly.

Various logging head sizes can be used to match the size of the casing ID and position the transducers at an optimum distance from the casing. The centralizers are preferably capable of accommodating a range of casing inside diameters at least as great as the range in which a given head size can be used.

Figure 2:
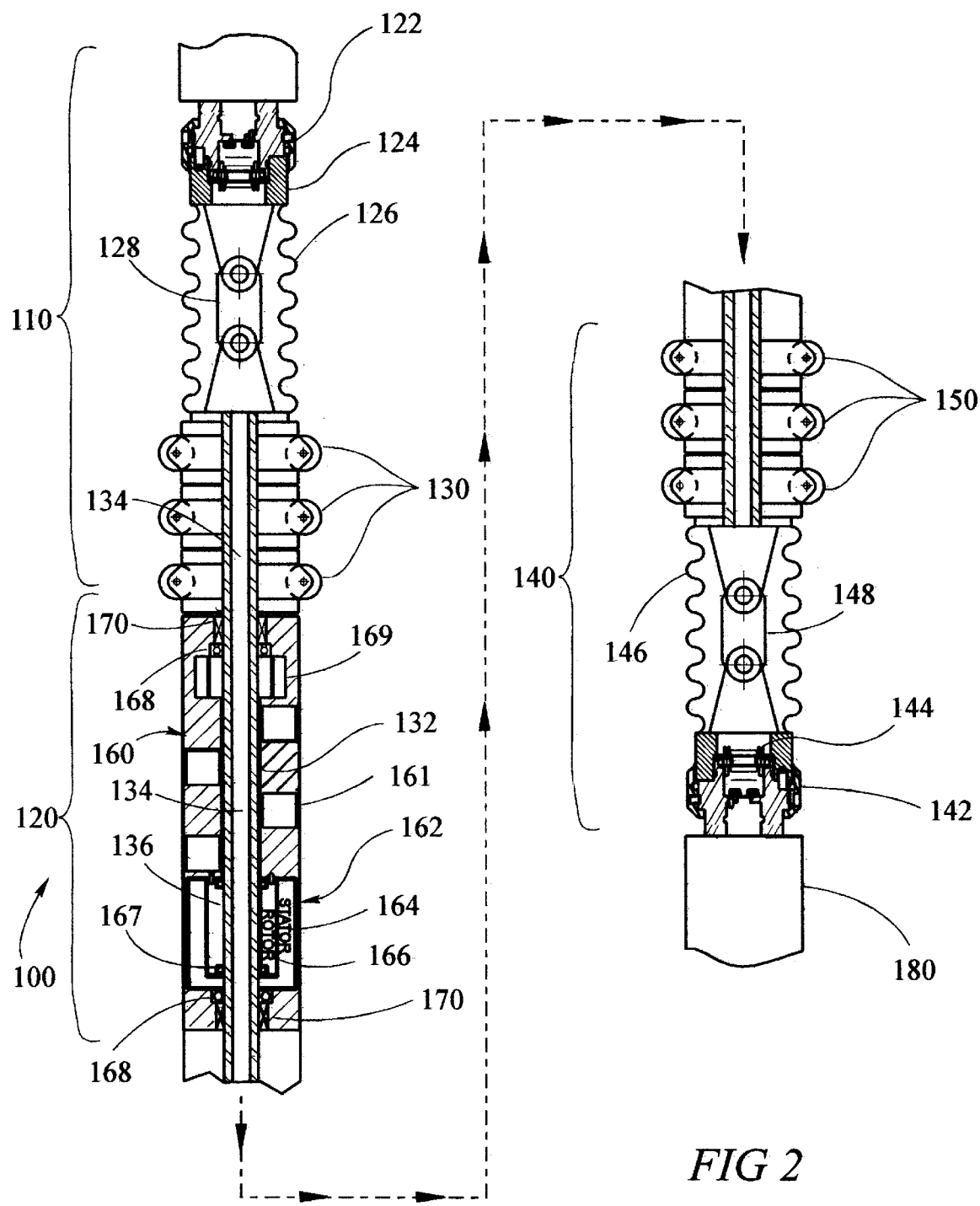
FIG. 2 is a schematic representation of a second embodiment of a logging tool constructed in accordance with the principles of the present invention.

Referring now to FIG. 2, a second embodiment of the present invention comprises upper and lower non-rotating assemblies 110, 140, respectively, with a rotating assembly 100 therebetween. Upper non-rotating assembly 110 a tool joint 122, a hermetic electrical connector 124, a bellows 126 surrounding a flexible coupling 128 and an upper centralizing mechanism 130. Similarly, lower non-rotating assembly 140 preferably comprises a tool joint 142, an electrical connector 144, a bellows 146 surrounding a flexible coupling 148 and an lower centralizing mechanism 150. Unlike the tool of FIG. 1, the centralizers of tool 100 do not rotate with the logging head.

As described above with respect to the tool joint 34 of FIG. 1, tool joints 122, 142 of FIG. 2 transmit axial forces and allow attachment and detachment of equipment. Hermetic electrical connectors 124, 144 provide electrical connections and a fluid block between the hydrostatic balancing fluid and the non-rotating component(s) as discussed below.

Flexible couplings 128, 148 allow lateral movement of rotating assembly 120 while providing axial and torsional support. Bellows 126, 146 enclose flexible couplings 128, 148 and form upper and lower portions of a hydrostatic pressure balancing system, respectively, as discussed below.

Still referring to FIG. 2, a non-rotating shaft 132 having a central wire passage 134 therethrough connects at its ends to upper and low centralizing mechanisms 130, 150. Lower non-rotating assembly 140 is suspended from upper non-rotating assembly 110 by means of shaft 132. The axial support provided by shaft 132, along with the flexibility and electrical connections provided by tool joint 142 and hermetic electrical connector 144, allows a tool constructed according to this embodiment to support additional equipment 180 below the rotating logging head. The equipment supported downhole is preferably lightweight, such as a lightweight neutron generator tool. Wires from equipment below tool joint 142 can traverse the length of tool 100 without interfering with operation of either the logging tool 100 or its hydrostatic pressure balancing system by passing through bellows 146, wire passage 134 and bellows 126. These wires are connected at their ends to hermetic electrical connectors 144, 124.

A middle portion 136 of shaft 132 extends between centralizers 130, 150. The rotating assembly 120 is rotatably mounted on middle portion 136. Rotating assembly 120 preferably comprises a rotating logging head body 160 in which are mounted a plurality of transducers 161. Body 160 houses a drive motor 162 comprising a stator 164 and a rotor 166. Rotor 166 is preferably affixed to body 160, while stator 164 is affixed to shaft 132, so that rotation of rotor 166 with respect to stator 164 causes rotation of the entire assembly 120. Alternatively, rotor 166 could be affixed to shaft 132 and stator 164 affixed to body 160, with corresponding modifications to the bearings inside the head. Bearings 167 facilitate rotation of rotor 166 with respect to stator 164. A bearing 168 at each end of body 160, facilitates rotation of body 160 with respect to shaft 132. A seal 170 at each end of body 160 maintains the integrity of the hydrostatic pressure balancing system, discussed below. Slip ring 169 electrically interconnects the rotating transducers and drive motor with the stationary wires located in wire passage 134. It will be understood that the foregoing motor arrangement can be used, with only minor modification, to drive the rotating assembly 90 of FIG. 1.

As in the embodiment of FIG. 1, the hydrostatic fluid pressure balancing system in the embodiment of FIG. 2 can comprise a piston-balanced reservoir (not shown) in fluid communication with a passage through tool joint 122, electrical connector 124, the interior of bellows 126, wire passage 134, and thus with the backs of transducers 161. Such a system would be essentially the same as the system shown in FIG. 1, although the reservoir need not necessarily be housed in a non-rotating portion of the tool. Alternatively, the piston-balanced reservoir could be eliminated. Instead, bellows 126 and/or bellows 146 can be constructed and sealed so as to form the requisite variable-volume reservoir for hydrostatic pressure balancing. In this embodiment, the end of the bellows is sealed and the fluid chamber does not extend beyond the adjacent electrical connectors 124, 144, which in this case must be high pressure hermetic connectors. For example, if the piston-balanced reservoir is located in the upper non-rotating tool, the connector 124 need not be a hermetic connector. Likewise, if both bellows are used as pressure-compensators both electrical connectors 124, 144 would be hermetic.

Figure 3:
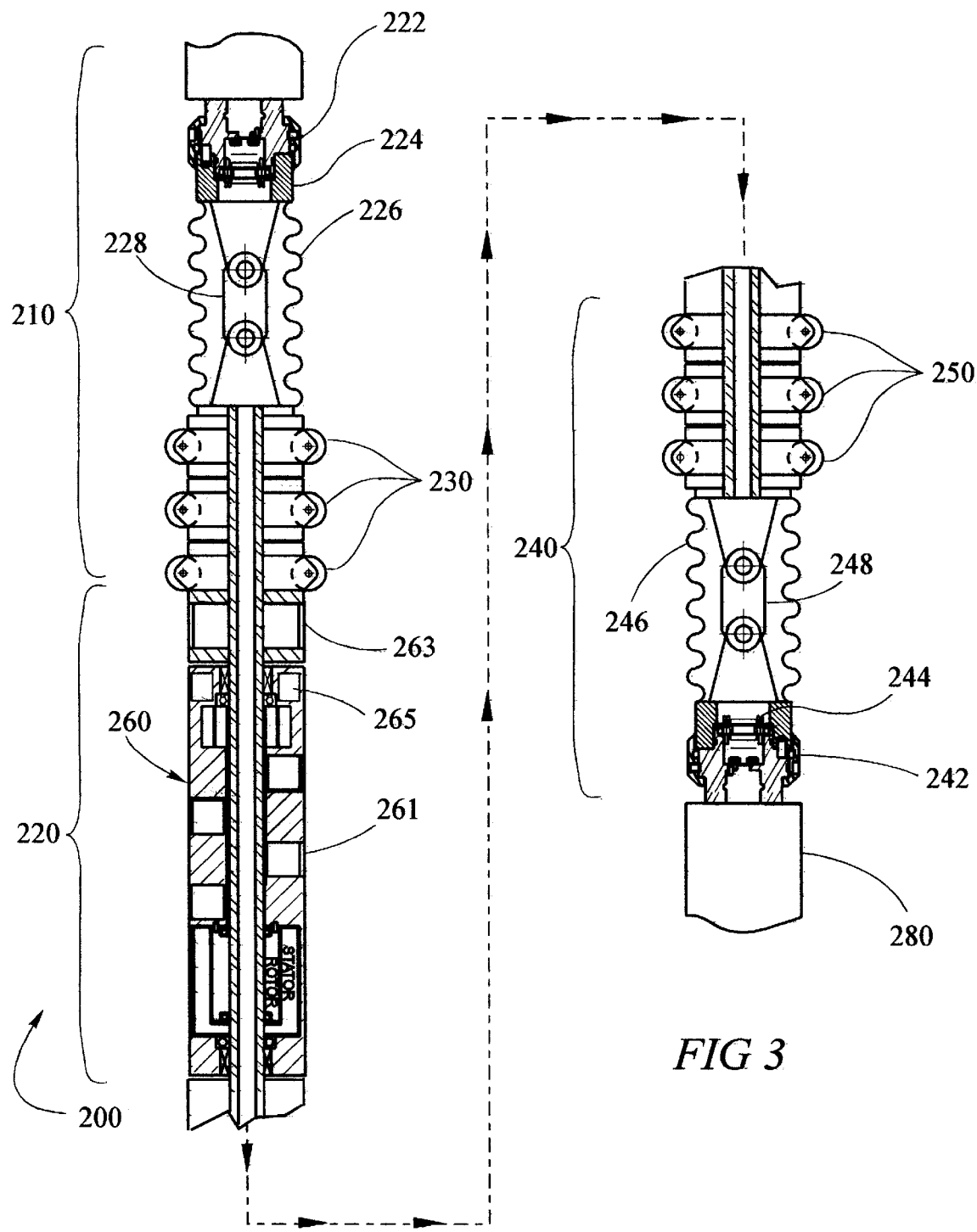
FIG. 3 is a schematic representation of a third embodiment of a logging tool constructed in accordance with the principles of the present invention.

Referring now to FIG. 3, another embodiment of the present invention is tool 200, which is similar to tool 100 of FIG. 2. To the extent that parts shown and described in FIG. 2 correspond to parts shown in FIG. 3, the parts in FIG. 3 have been given corresponding reference numerals. Tool 200 differs from tool 100 in that it includes a separate, non-rotating receiver array 263 positioned adjacent upper centralizer mechanism 230. The receivers in array 263 can receive signals from transducers 261 according to known logging techniques.

According to one preferred embodiment tool 200 further includes an additional array of transmitters 265 on, which are positioned so as to optimize transmission of their signals to receivers 263. The receiver array 263 can have elements that are small compared to the acoustic wavelength. The transmitter array 265 can have relatively few elements oriented at various angles and having dimensions larger than the acoustic wavelength. It will be understood that transmitter array 265 can be included on other embodiments of the present invention.

The configuration of tool 200 is preferred for imaging systems that require multiple orientations of transducers. It has been found that a few transmitter transducers with relatively large apertures give the best signal-to-noise ratio for imaging. An array of several small receivers, however, is advantageous for selecting the optimum receiver aperture. As receivers tend to be more sensitive to noise than are transmitters, it is typically necessary to include specialized, low-noise slip rings when it is desired to use an array of several small receivers on a rotating head. Thus, by including receiver array 263 on the non-rotating portion of tool 200, the need for these low-noise slip rings is eliminated and the number of electrical connections in the slip ring is reduced.

Figure 4A:
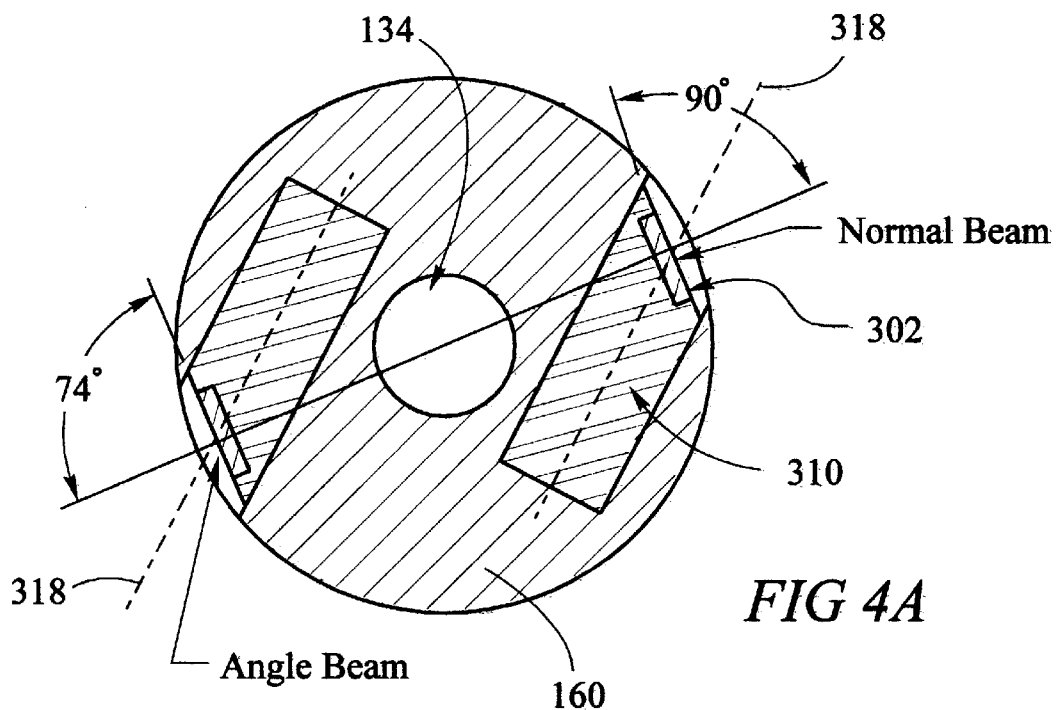
FIGS. 4A and 4B are schematic representations of a preferred embodiment of a novel transducer configuration according to the present invention.
Figure 4B:
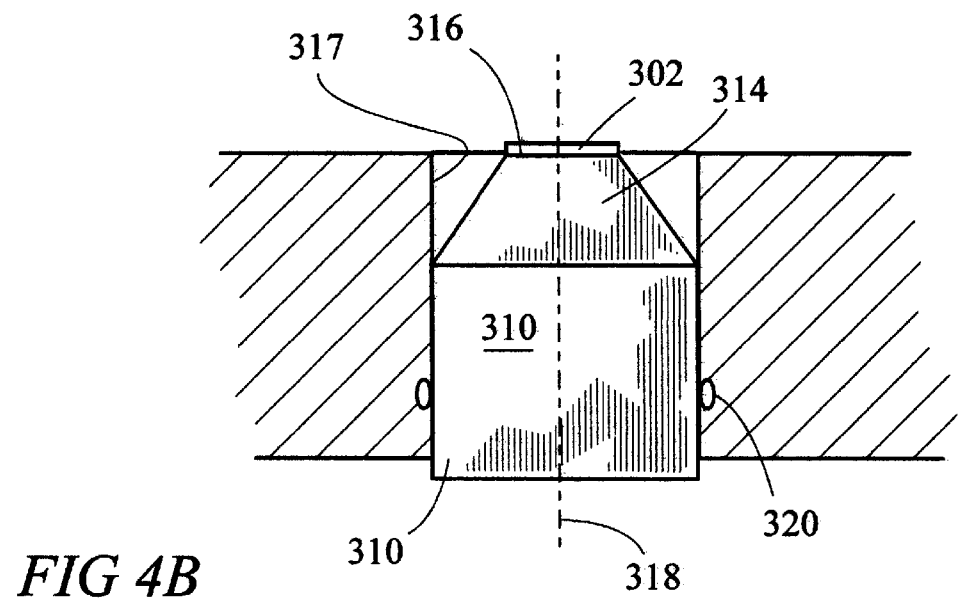

Referring now to FIGS. 4A and 4B, a preferred transducer 300 for use in the tools of FIGS. 2 and 3 includes a piezoelectric element 302 mounted on a backing member 310. Piezoelectric element 302 has an exposed surface and a backing surface and is preferably, but not necessarily, non-circular. Backing 310 preferably comprises a cylindrical base 312 and a tapered extension 314, which terminates at a face 316, which corresponds in shape to the shape of the backing surface of piezoelectric element 302. Piezoelectric element 302 is affixed to face 316 in a conventional manner. Backing 310 is mounted in a recess 317 in logging head body 160 (or 260) with its innermost portion exposed to the pressurized fluid that forms part of a hydrostatic pressure balancing system. Tapered extension 314 may have any cross-section, but a conical or pyramid-shaped extension may be most advantageous due to manufacturing considerations. Regardless of the shape of extension 314, it preferably shares a common axis 318 with base 312. Unlike the transducers commonly in use in prior art tools, axis 318 does not lie on a radius of the logging tool, but is shifted so that it does not intersect the tool axis. This means that the body of backing 310 can be made longer than would otherwise be possible. It is desirable to provide as long a backing as possible, so as to maximize attenuation of the backing reverberations that are generated when transducer 302 is fired. In FIG. 4, the face of the left-hand transducer lies at an angle of 74 degrees with respect to a tool radius passing through its center, while the face of the right-hand transducer lies at an angle of 90 degrees with respect to a tool radius passing through its center. It will be understood that this angle can be varied as desired, depending on the desired direction of the transducer radiation pattern.

As shown in FIGS. 4A and 4B, it is preferred that the surfaces of tapered backing extension 314 not touch the material from which body 160 is formed, so as to avoid undesired secondary reverberations in the borehole fluid. Referring particularly to FIG. 4B, it is further preferred that the transducer mount include an O-ring 320 that forms as seal between body 160 and base 312. This seal prevents the oil or other fluid used in the fluid-pressure balancing system from leaking out around the transducer.

The system described herein provides many advantages over prior art tools, including improved performance for tools with transducers mounted in a rotating head, which are primarily used in cement bond evaluation, or open hole borehole imaging tools. Performance is improved by more accurately centralizing the transducer head in the borehole independently of the tool body. In addition, the tools shown in FIGS. 2 and 3, which include a central load-bearing non-rotating shaft, have the advantage of allowing a non-rotating tool (such as the lightweight neutron generator tool) to be attached below the acoustic scanner for making other measurements.

It will be recognized that various modifications can be made in the design and operation of the present invention without departing from the spirit thereof. Thus, while the principal preferred construction and mode of operation of the invention have been explained in what is now considered to represent its best embodiments, it should be understood that within the scope of the appended claims the invention may be practiced otherwise than as specifically illustrated and described.

What is claimed is:

1. An apparatus for logging a borehole, comprising:
a non-rotating component; and
a rotating component attached to said non-rotating component by a coupling that allows lateral movement of said rotating component with respect to said non-rotating component and including a logging head, said rotating component being centralized independently from said non-rotating component such that said rotating component remains centralized as it rotates, regardless of whether said non-rotating component is centralized.

2. An apparatus for logging a borehole, comprising:
a non-rotating component; and
a rotating component flexibly attached to said non-rotating component and including a logging head, said rotating component being centralized independently from said non-rotating component such that said rotating component remains centralized as it rotates, regardless of whether said non-rotating component is centralized;
said rotating component including centralizers that rotate with said logging head.

3. The apparatus of claim 2 wherein said centralizers include casters.

4. The apparatus of claim 1 wherein said rotating component includes centralizers that do not rotate with said logging head.

5. The apparatus of claim 1 wherein said logging head includes at least one signaling device electrically connected to a controller in said non-rotating component.

6. The apparatus of claim 5 wherein said signaling device comprises an acoustic transducer.

7. The apparatus of claim 6, further including a hydrostatic pressure balancing system.

8. The apparatus of claim 7 wherein said hydrostatic pressure balancing includes a sealed, variable-volume fluid reservoir in fluid communication with said transducer.

9. The apparatus of claim 8 wherein none of said hydrostatic pressure balancing system is housed in said non-rotating component.

10. The apparatus of claim 8 wherein a portion of said variable-volume fluid reservoir is housed in said non-rotating component.

11. The apparatus of claim 10, further including a releasable connection between said rotating component and said non-rotating component that is capable of maintaining fluid in both the portion of said fluid reservoir that is housed in said non-rotating component and the portion of said fluid reservoir that is in fluid communication with said transducer when said rotating component is disconnected from said non-rotating component.

12. The apparatus of claim 8 wherein said fluid reservoir comprises a bellows.

13. The apparatus of claim 8 wherein said bellows is hermetically sealed to said rotating component.

14. An apparatus for logging a borehole, comprising:

a non-rotating component;

a rotating component flexibly attached to said non-rotating component and including a logging head, said rotating component being centralized independently from said non-rotating component such that said rotating component remains centralized as it rotates, regardless of whether said non-rotating component is centralized; and a motor for rotating said rotating component, said motor being housed in said rotating component.

15. The apparatus of claim 1, further including a motor for rotating said rotating component, said motor being housed in said non-rotating component and transmitting torque to said rotating component through said coupling.

16. The apparatus of claim 1, further including a second non-rotating component suspended below said rotating component.

17. The apparatus of claim 16 wherein said second non-rotating component is suspended from a non-rotating shaft that passes through said rotating component.

18. The apparatus of claim 17 wherein said non-rotating shaft has first and second ends that each support a centralizer such that said rotating component is mounted on said shaft between said centralizers.

19. The apparatus of claim 17 wherein said non-rotating shaft supports at least one non-rotating transducer.

20. An apparatus for logging a borehole, comprising:

a non-rotating component; and a rotating component flexibly attached to said non-rotating component and including a logging head, said rotating component being centralized independently from said non-rotating component such that said rotating component remains centralized as it rotates, regardless of whether said non-rotating component is centralized;

said logging head including at least one signaling device electrically connected to a controller in said non-rotating component;

said logging head further including a motor for rotating said rotating component, said motor being housed in said logging head.

21. The apparatus of claim 17, further including a second non-rotating component suspended below said rotating component.

22. The apparatus of claim 21 wherein said second non-rotating component is suspended from a non-rotating shaft that passes through said rotating component.

23. The apparatus of claim 21 wherein said non-rotating shaft has first and second ends that each support a centralizer such that said rotating component is mounted on said shaft between said centralizers.

24. The apparatus of claim 21 wherein said non-rotating shaft supports at least one non-rotating transducer.

25. A method for logging, comprising:

providing a logging tool on an independently rotatable logging head that is suspended from a non-rotating component;

rotating the logging head while logging; and allowing lateral movement of the logging head with respect to the non-rotating component and centralizing the logging head independently from non-rotating component while logging.

26. The method of claim 25, further including the step of transmitting electrical signals from the logging head to a component housed in the non-rotating component.

27. The method of claim 25, further including the step of balancing hydrostatic pressure inside the logging head with the hydrostatic pressure outside the logging head.

28. The method of claim 25 wherein said centralizing step includes allowing the logging head to shift laterally with respect to said non-rotating component.

29. A method for logging, comprising:

providing a logging tool on an independently rotatable logging head that is suspended from a non-rotating component;

rotating the logging head while logging by driving said rotation of the rotating logging head with a drive motor that is housed in the logging head; and centralizing the logging head independently from non-rotating component while logging.

* * * * *